United States Patent [19]
Ellwein

[11] Patent Number: 4,495,230
[45] Date of Patent: Jan. 22, 1985

[54] NEEDLEWORK ART FORM

[76] Inventor: Rebecca A. Ellwein, 2213 Windy Pines Bend, Virginia Beach, Va. 23456

[21] Appl. No.: 509,303

[22] Filed: Jun. 30, 1983

[51] Int. Cl.³ .................. B44F 3/00; G09B 19/20
[52] U.S. Cl. ........................ 428/13; D11/136; 156/63; 206/574; 206/575; 428/79; 428/906.6; 434/95
[58] Field of Search ............ 428/13, 79, 906.6, 39, 428/913.3, 15; 434/84, 95; D11/136; 156/63; 206/574, 575

[56] References Cited

U.S. PATENT DOCUMENTS

| D. 201,501 | 6/1965 | Hovdal | D11/136 |
| 2,026,708 | 1/1936 | Rubin | D11/136 X |
| 2,575,470 | 11/1951 | Salz | 428/906.6 X |
| 2,784,513 | 3/1957 | Urbach | 428/15 |
| 2,982,042 | 5/1961 | Gick | 428/79 |
| 3,269,032 | 8/1966 | Sumner | 434/95 |
| 3,554,848 | 1/1971 | Dock | 428/15 |
| 3,604,558 | 9/1971 | Frerebeau | 434/84 X |
| 3,705,836 | 12/1972 | Francis et al. | 428/79 X |
| 3,976,807 | 8/1976 | Sweeney et al. | 428/16 |
| 4,212,133 | 7/1980 | Lufkin | 428/13 X |
| 4,310,313 | 1/1982 | Brundige | 434/95 |
| 4,404,750 | 9/1983 | Marx et al. | 428/906.6 X |

FOREIGN PATENT DOCUMENTS 625095  6/1949  United Kingdom ............ 40/158 R Primary Examiner—Henry F. Epstein
Attorney, Agent, or Firm—Brady, O'Boyle & Gates

[57] ABSTRACT

A thin foraminous substrate such as a woven fabric substrate, has imprinted thereon a design to accept needlework. A dominant portion of the imprinted design on the substrate is adapted to register with a three dimensional decorative applique, for example, a hand painted ceramic applique representative of a human face or other body part. The three dimensional applique is attached by adhesive to the substrate. Other three dimensional objects may also be applied to the substrate, typical examples being numbers, letters and shapes such as balloons, flowers and geometric designs.

12 Claims, 4 Drawing Figures

U.S. Patent    Jan. 22, 1985    4,495,230
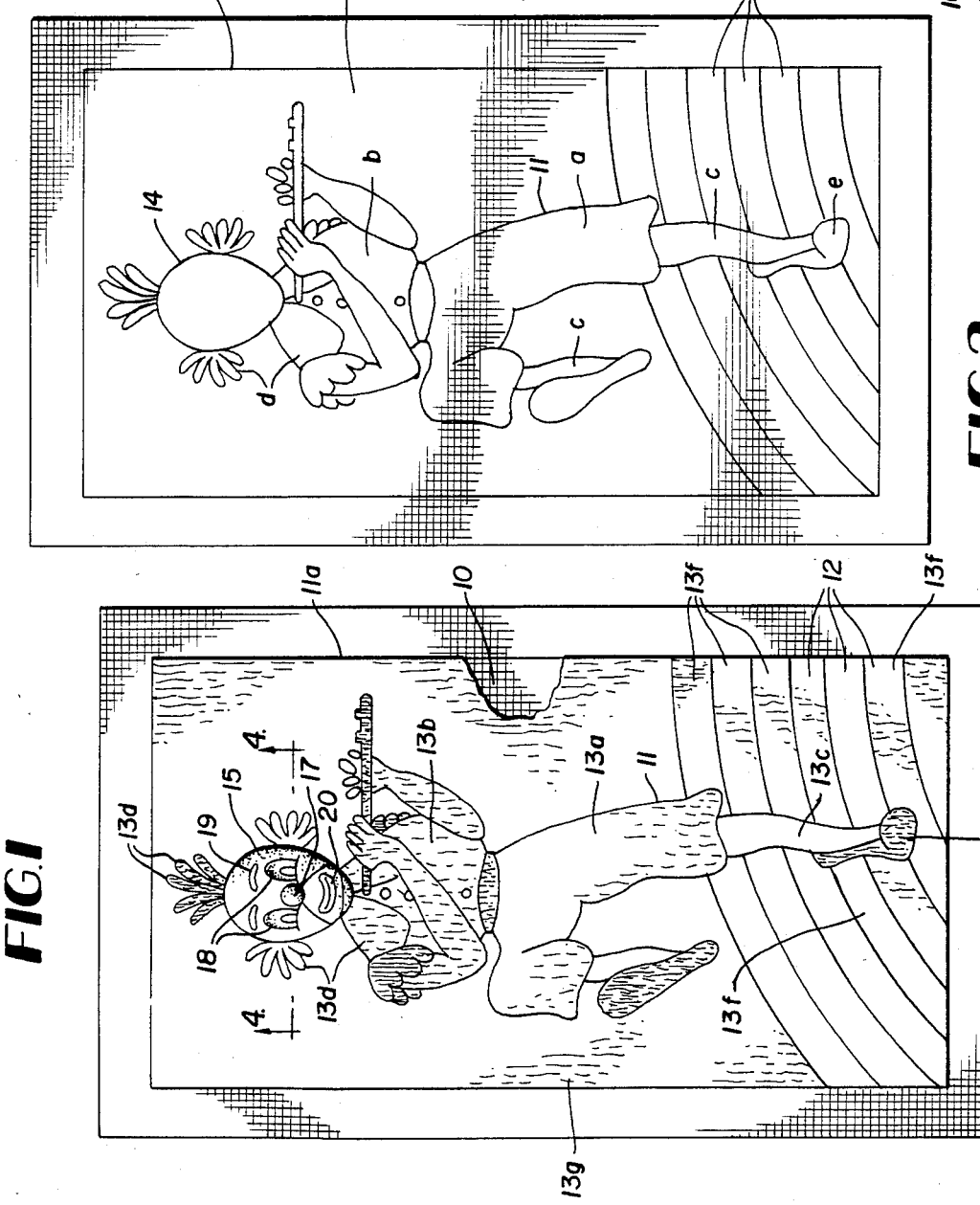
FIG.1
FIG.2
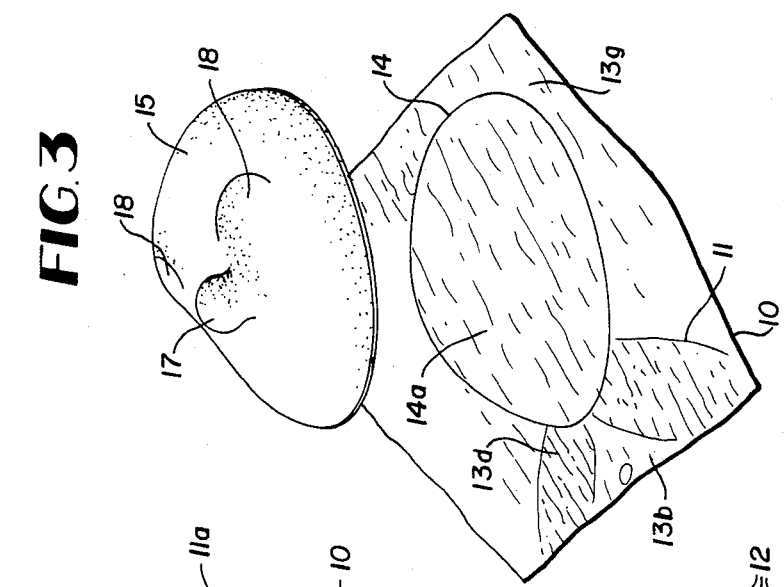
FIG.3
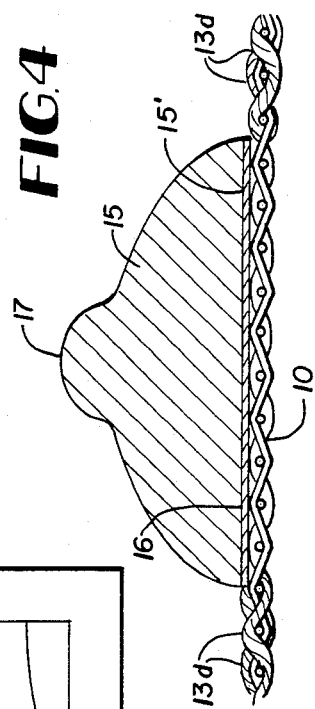
FIG.4

NEEDLEWORK ART FORM

BACKGROUND OF THE INVENTION

Needlework, such as needlepoint, is enjoying increased popularity as an art form in current times. Retailers of needlepoint base material provide the material in many sizes suitable for framing, and endless varieties of artistic forms are imprinted upon the base material to assist the needlepoint hobbyist in producing a given needlepoint artistic design in a variety of colors on the base.

The object of this invention is to provide a means for imparting a more lifelike appearance to the needlepoint design produced on the imprinted base by applying to the base in registration with a dominant part of the design a three dimensional applique or element, such as a hand painted ceramic face in the case of a design which depicts a human figure or an animal. The resulting art form is in part three dimensional in its finished form and has a striking and unusual appearance which cannot be obtained by means of needlework alone. A substantially endless variety of pictorial designs suitable for framing can be produced in accordance with the invention.

Other features and objects of the invention will become apparent during the course of the following detailed description.

BRIEF DESCRIPTION OF THE DRAWINGS

FIG. 1 is a plan view of a needlework art form according to the invention in its completed state.

FIG. 2 is a plan view of a foraminous woven textile base prior to the application of yarn thereto and having an artistic design imprinted thereon.

FIG. 3 is an exploded perspective view of components of the art form prior to being united.

FIG. 4 is a fragmentary cross section taken on line 4—4 of FIG. 1.

DETAILED DESCRIPTION

Referring to the drawings in detail wherein like numerals designate like parts, the numeral 10 designates a foraminous base or substrate formed of coarsely woven textile material of the kind normally employed in the production of needlepoint. The substrate 10 can be provided in any required shape or size.

The substrate 10 has imprinted thereon at least the marginal outline 11 of an artistic design or form, such as a human form, animal form or the form of an inanimate object. For the sake of illustration, a human form is imprinted on the foraminous substrate 10 shown in FIG. 2.

The imprinted form or design on the substrate 10 can vary widely as to detail, and according to a preferred form of the invention includes variously colored areas a, b, c, d, and e within the marginal outline 11, which colored areas serve as a guide and color code for the application of needlepoint or embroidery yarn of like colors inside of the marginal outline 11. The imprinted design on the substrate 10 can also include variously colored background areas, such as striping 12, FIG. 2, to receive yarns of matching colors. The kinds of designs which are preprinted on the substrate 10 are virtually without limit, and the present human figure design with background striping is merely one illustration, and should not be taken in a limiting sense. The imprinted design can also include a border 11a.

Referring to FIG. 1, the variously colored areas within the marginal outline 11 are filled in by the user with yarns 13a, 13b, 13c, 13d and 13e of the same colors which are imprinted on the substrate 10 as shown in FIG. 2. These areas and colors can vary widely in number, shape and size, depending upon the design selected. Additional yarns 13f are applied to the striped areas 12 in colors which match those imprinted on the substrate 10. Finally, the entire background area of the substrate outside of the design margin 11 and inside of the border 11a is filled in with yarn 13g in a natural color or white, so as to form a suitable background for the chosen design.

The dominant feature area of the imprinted design, such as the head and face of a human figure having a margin 14 on the substrate 10, is also filled in with suitable yarn 14a, FIG. 3, to enable this area within the margin 14 to more readily accept a three dimensional applique applied with adhesive.

In accordance with an important feature of the invention, a three dimensional sculptured applique 15, such as a hand painted ceramic applique, having the exact marginal shape of the area 14a is attached by an all purpose adhesive 16 to the substrate 10 in accurate registration with the printed margin 14.

The attached applique 15 has a flat rear surface 15' to facilitate its mounting with adhesive on the substrate 10. The applique 15 in the drawings comprises human face which is moulded or sculptured to form a nose 17, eyesockets 18, and other desired facial features. Other features such as eyebrows, beard, lips and the like can be produced by hand painting the applique or may be formed on the applique by other means such as by clay. Again it should be emphasized that these decorative features can vary widely in shape, size, and coloring according to the invention. The applique 15 can be sold with the preprinted substrate in plain or undecorated form to be hand painted or otherwise completed by the purchaser. In some cases, a completely decorated applique can be sold to the customer along with the imprinted substrate 10.

In any case, it is contemplated to place the three dimensional applique in a small plastic envelope for safe keeping, which envelope can be stapled or otherwise conveniently attached to the substrate 10 and sold therewith as a kit or unit.

In lieu of ceramics, the sculptured applique 15 may consist of hard wood, molded plastics, or the like. The resulting art form depicted in FIG. 1 is life-like, due to the three dimensional nature of the decorated applique 15. The finished product is suitable for framing, as a wall or table ornament, although it may be used in other ways desired.

If an inanimate object is imprinted on the substrate 10, the three dimensional applique is designed to be applied at a dominant feature area of the imprinted design. Such an object could be the setting sun, the moon, chimney of a house, automobile radiator, or the like. It may be seen that the art form produced according to this invention is versatile, and satisfied a need in the art which heretofore has not been fulfilled.

The needlework applied to the substrate 10 can be needlepoint, x-stitching and other forms of embroidery.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A needlepoint art form which can be provided both in kit form as well as a finished product, comprising in combination:
   a needlepoint base in the form of an apertured flexible substrate to which colored needlepoint yarns are applied by needlepoint operations;
   a design imprinted on said base within a marginal outline, said design further including color coded areas serving as guides for correspondingly colored yarns;
   said design further including a predetermined single relatively small but nevertheless visually dominant feature area defining an applique outline which is less than the overall size of said design and which is also to be filled with yarn; and
   a single decorated three dimensional solid applique comprising but a part of said design, formed by molding, sculpturing and the like, and having a perimeter corresponding to the outline of said dominant feature area affixed thereto over said yarn following needlepoint application.

2. An art form as defined in claim 1 wherein the design imprinted on the substrate comprises at least in part a human figure.

3. An art form as defined in claim 2 wherein the dominant feature area and three dimensional solid applique applied thereto comprises a face of a human figure.

4. An art form as defined in claim 1 wherein said applique includes a substantially flat rear face to abut yarns applied to said substrate at said dominant feature area, and adhesive means between said flat rear face and said yarns.

5. An art form as defined in claim 1 wherein said substrate includes a criss-cross fabric pattern.

6. An art form as defined in claim 1, wherein said applique is formed of a ceramic.

7. An art form as defined in claim 1, wherein said design includes a human figure and at least some of the color coded areas depict articles of clothing for said human figure and wherein said applique comprises a colored three dimensional body part of said human figure.

8. An art form as defined in claim 1 wherein said design comprises a human figure and selected color coded areas depict articles of clothing for said figure, and said applique comprises a simulated human face having surface decoration thereon depicting human facial features.

9. An art form as defined in claim 1 wherein said applique comprises a hand painted ceramic applique.

10. An art form as defined in claim 1 wherein said design comprises an artistic form of a human or animal figure, said dominant feature area comprises the area of the face of said figure and said applique comprises a three dimensional decorated face of said figure.

11. An art form as defined in claim 10 wherein said face is comprised of a painted ceramic body member.

12. An art form as defined in claim 11 wherein said artistic form of said figure is a caricature of said human or animal figure.

* * * * *